(12) United States Patent
Krebs et al.

(10) Patent No.: US 7,395,836 B2
(45) Date of Patent: Jul. 8, 2008

(54) SCREWABLE CHECK VALVE

(75) Inventors: Clemens Krebs, Tuebingen (DE); Herbert Dreher, Horb (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 202 days.

(21) Appl. No.: 10/564,577

(22) PCT Filed: May 12, 2004

(86) PCT No.: PCT/EP2004/005100

§ 371 (c)(1),
(2), (4) Date: Jun. 28, 2006

(87) PCT Pub. No.: WO2005/008110

PCT Pub. Date: Jan. 27, 2005

(65) Prior Publication Data

US 2007/0023087 A1   Feb. 1, 2007

(30) Foreign Application Priority Data

Jul. 16, 2003   (DE)   ................................. 103 32 347

(51) Int. Cl.
*F16K 15/04*   (2006.01)
*F16K 27/00*   (2006.01)

(52) U.S. Cl. .................. 137/539; 137/269; 137/315.33; 137/454.2; 137/538; 251/366

(58) Field of Classification Search .................. 137/269, 137/454.2, 454.4, 454.5, 535, 538, 539; 251/366
See application file for complete search history.

(56) References Cited

U.S. PATENT DOCUMENTS

| 2,912,001 | A | 11/1959 | Green |
| 4,977,927 | A | 12/1990 | Hill |
| 6,651,693 | B2 * | 11/2003 | Simmons et al. ........ 137/329.05 |
| 2002/0144734 | A1 * | 10/2002 | Kjellander et al. .......... 137/538 |

FOREIGN PATENT DOCUMENTS

| BE | 787.894 | 12/1972 |
| DE | 2449443 | 4/1976 |
| DE | 8801759 | 6/1989 |
| DE | 29620916 | 4/1998 |
| FR | 853.058 | 4/1939 |

* cited by examiner

*Primary Examiner*—Ramesh Krishnamurthy
(74) *Attorney, Agent, or Firm*—Scully, Scott, Murphy & Presser, P.C.

(57) ABSTRACT

Disclosed is a check valve (5) that is screwed into a threaded bore (1) of a housing (2) of a hydraulic subassembly between a first pressure side (26) and a second pressure side (27) by means of an external thread (11) which is disposed in a first cylinder section (8) of a cylindrical valve housing (6) of the check valve (5). A passage duct (39) which allows a hydraulic fluid to flow between the sidewall of the threaded bore (1) and a first removed portion (16) of the surface area (10) of the cylindrical valve housing (6) is embodied in at least one angular segment (a1, a2, and a3) of the valve housing (6).

17 Claims, 3 Drawing Sheets

SCREWABLE CHECK VALVE

The invention relates to a nonreturn valve which can be screwed into a hydraulic fluid-conveying pressure line having a thread.

Comparatively simple and secure fastening of a nonreturn valve in a pressure line is obtained by means of a screwed connection. For this purpose, the nonreturn valve is fitted by its external thread provided on the valve housing into the internal thread formed in the pressure line.

The screwed connection produces both a form-fitting and force-fitting connection between the nonreturn valve and the pressure line. Additional sealing by means of sealing rings (e.g. O-rings) can be dispensed with in this case. Mounting and demounting also proves to be comparatively simple. Additional components such as, for example, screws are not necessary to fasten the nonreturn valve in the pressure line. By forming suitable engagement surfaces on the nonreturn valve which correspond to the standard dimensions of screwing tools, the nonreturn valve can be fastened in the pressure line and also removed again relatively simply using a standard screwing tool.

The constructional requirements of a screw-in nonreturn valve are, in particular, a compact construction of the nonreturn valve in the axial and radial direction, while allowing for a flow cross-section as large as possible for the operating state in which the nonreturn valve is open. Even the formation of the external thread on the valve housing requires a certain additional constructional volume in the overall volume of the nonreturn valve, which either leads to an increase in the overall volume of the nonreturn valve in the radial direction and possibly also in the axial direction or which unnecessarily reduces the space still available for forming the flow duct and hence the flow cross-section inside the nonreturn valve.

BACKGROUND

DE 24 49 443 A1 describes a screw-in nonreturn valve, the valve housing of which takes up a comparatively large space in the radial direction. This is due to the fact that the diameter of the valve housing is composed in the least favourable case, owing to the arrangement of the individual functional units, of the cross-sections of the external thread, the valve housing portion of the valve housing, the valve body and the flow duct between the valve housing portion and the valve body, which are each suitably dimensioned in accordance with their function.

In the axial direction, too, the nonreturn valve of DE 24 49 443 A1 has a comparatively large extent. The comparatively large axial extent results from the addition of the geometry of the axially arranged functional units of the valve seat body, the valve body and the tension spring, as well as an additional space for a screwing tool which engages in each case on the inner surfaces of the valve housing for the screwing of the nonreturn valve.

SUMMARY OF THE INVENTION

The object on which the invention is based, therefore, is to develop the nonreturn valve having the features according to the precharacterising clause of claim 1 in such a way that, through a novel constructional arrangement and geometrical configuration of the individual functional units required for a nonreturn valve, a very compact construction of the nonreturn valve in the radial and axial direction is achieved, while at the same time allowing for a sufficiently large flow cross-section of the flow duct, and to increase the functional reliability the spring is not arranged in the flow region.

The object of the invention is achieved by a nonreturn valve having the features of claim 1.

According to claim 1, by forming a passage duct by removal of material from the lateral surface of the valve housing for the hydraulic fluid flow, the flow duct is transferred to the constructional space of the external thread and furthermore partly to the valve-housing constructional space situated inside the external thread. Thus, no additional constructional space has to be provided for the flow duct in the radial direction of the valve housing, which markedly reduces the extent of the nonreturn valve in the radial direction.

Advantageous refinements of the invention are specified in the dependent claims.

By realising the flow duct, according to claim 2, using three passage ducts distributed uniformly on the lateral surface of the valve housing, the flow duct cross-section is additionally increased and a flow profile is produced inside the nonreturn valve which approximates the laminar flow in the pressure-line region upstream and downstream of the nonreturn valve.

The external thread on the valve housing extends over only a limited cylindrical portion of the hollow-cylindrical valve housing. Therefore, sufficient free space is available at the outer lateral surface of the valve housing to form engagement surfaces for a screwing tool for screwing the nonreturn valve into the internal thread of the pressure line. These engagement surfaces, which are likewise produced by removal of material from the lateral surface of the valve housing, are formed on the valve housing in the axial direction at the level of the spring or spring plate and do not therefore require any additional axial extension of the valve housing of the nonreturn valve, as in the case of the engagement surfaces in the nonreturn valve of DE 24 49 443 A1.

Thus, by constructionally redesigning the nonreturn valve, a valve housing is realised which is compact in the axial as well as radial direction and has a flow duct with sufficiently large flow cross-section and a quasi-laminar flow profile.

BRIEF DESCRIPTION OF THE DRAWINGS

An exemplary embodiment of the invention is illustrated in the drawing and described in more detail below. In the drawing.

Figure 2:
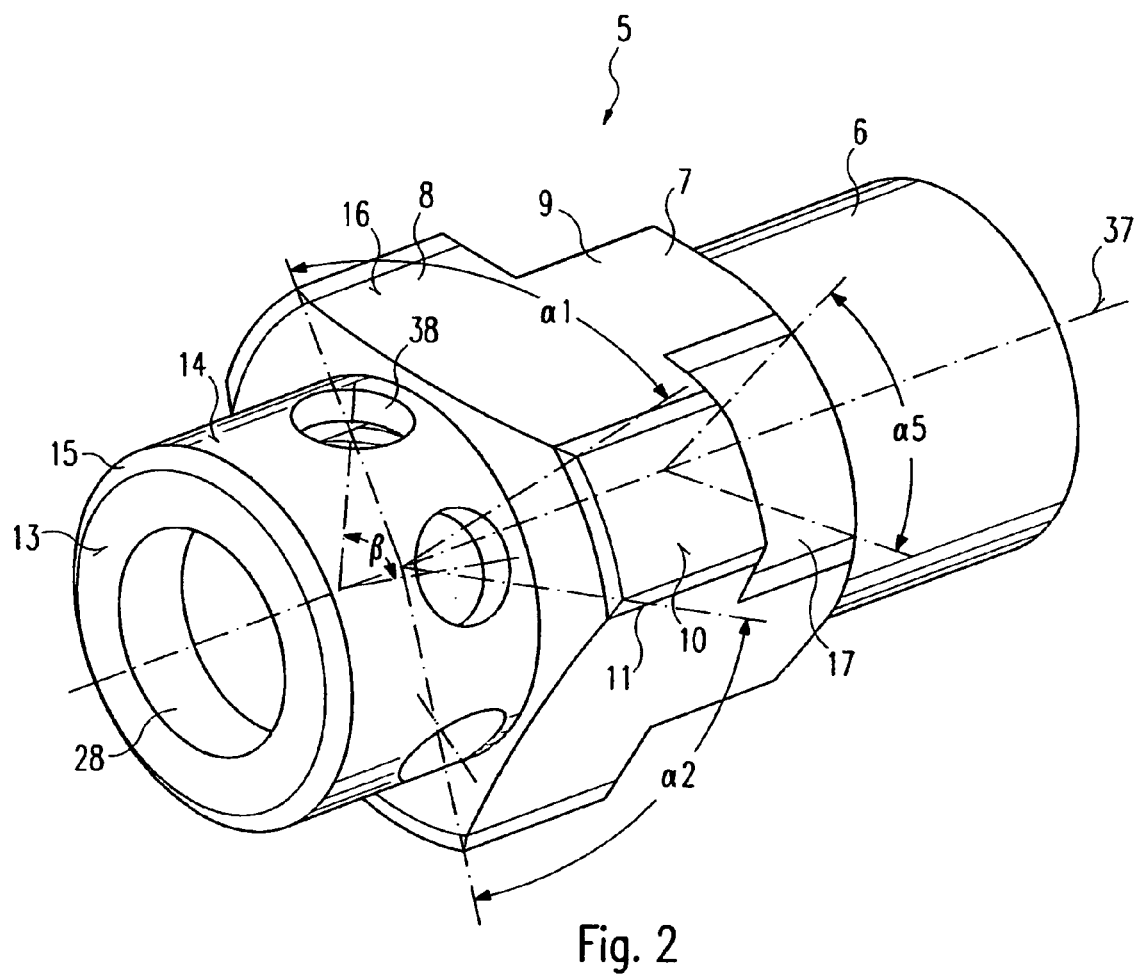
FIG. 2 shows a three-dimensional illustration of a nonreturn valve according to the invention.
Figure 3:
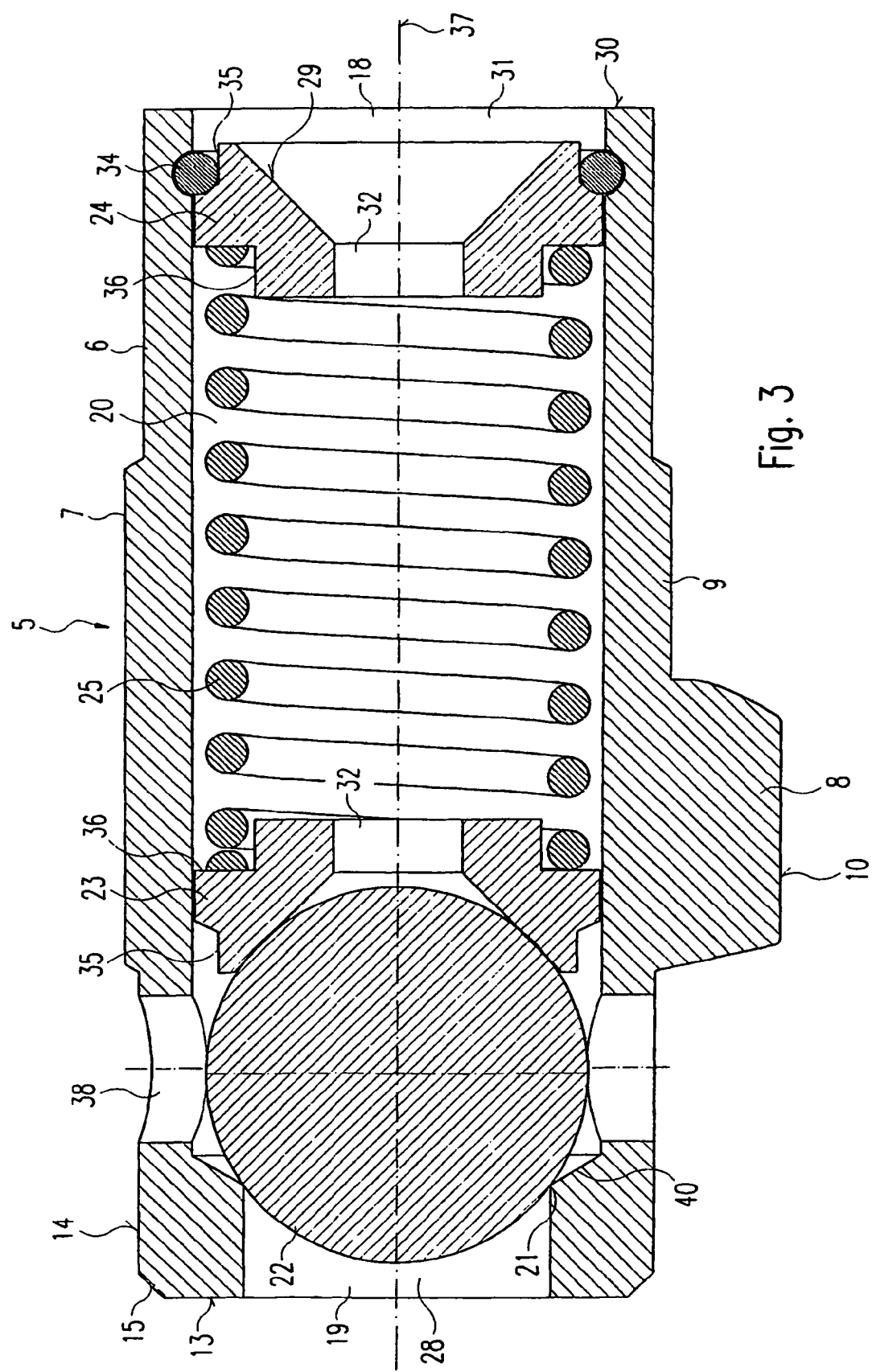
FIG. 3 shows a cross-section of a nonreturn valve according to the invention.

The nonreturn valve according to the invention is described below with reference to FIG. 1 to FIG. 3.

DETAILED DESCRIPTION

Figure 1:
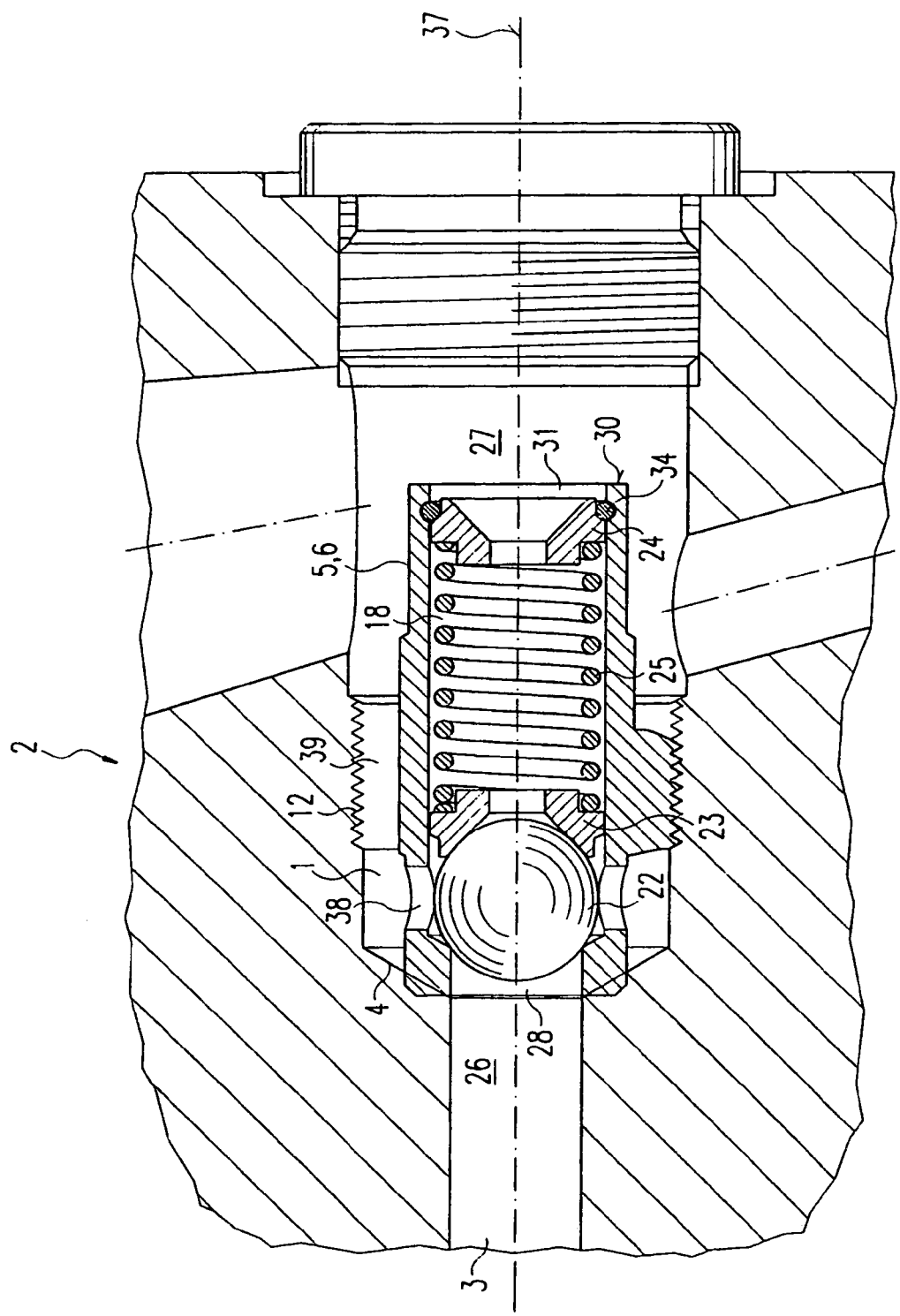
FIG. 1 shows a cross-sectional illustration of a pressure line system having a nonreturn valve according to the invention, screwed into a threaded bore.

The threaded bore 1, which is situated according to FIG. 1 in the housing 2 of a hydraulic assembly, for example an axial piston machine, has an internal thread 12. The threaded bore 1 continues at its deepest end-point in a continuation bore 3, the inside diameter of which is designed smaller than the inside diameter of the threaded bore 1. The transition 4 between the threaded bore 1 and the continuation bore 3 has a conical form.

The nonreturn valve 5 has a primarily cylindrical valve housing 6. Approximately in the middle third of the valve housing 6—when the valve housing 6 is viewed in the axial direction—the valve housing 6 has a primarily radially oriented enlargement 7. This primarily radially oriented enlargement 7 is subdivided into a first cylindrical portion 8 and a second cylindrical portion 9, each of approximately half its axial extent. While the outside diameter of the first cylindrical portion 8 corresponds to the inside diameter of the threaded bore 1, the outside diameter of the second cylindrical portion 9 is less prominent.

The first cylindrical portion 8 has on its outer lateral surface 10 an external thread 11 which is screwed into the internal thread 12 of the threaded bore 1. The internal thread 12 here is cut into the threaded bore 1 to such an extent that, when the nonreturn valve 5 is fully screwed into the threaded bore 1, the valve housing 6 of the nonreturn valve 5 is pressed, by its bevelled edge 15 situated between the front end face 13 and the cylindrical lateral surface 14, against the conical transition 4 between threaded bore 1 and continuation bore 4. Owing to this form-fitting contact between the valve housing 6 and the conical transition 4, the hydraulic fluid is prevented from flowing between the valve housing 6 and the conical transition 4.

In the first cylindrical portion 8, first regions of material removal 16 are provided at the outer lateral surface 10 in two, three or four equal-sized angular segments $\alpha 1$, $\alpha 2$, $\alpha 3$ and $\alpha 4$ (in FIG. 2 the embodiment is illustrated with three equal-sized angular segments $\alpha 1$, $\alpha 2$ and $\alpha 3$, the angular segment $\alpha 3$ not being visible in FIG. 2 owing to the perspective illustration) which are arranged at equal-sized angular distances with respect to one another, the regions of material removal 16 resulting in a levelling of the cylindrical lateral surface 10 in the angular segments $\alpha 1$, $\alpha 2$, $\alpha 3$ and $\alpha 4$. Each first region of material removal 16 thus forms a throughflow duct 39 for a hydraulic fluid flow between the lateral surface of the threaded bore 1 and the surface of the region of material removal 16 of the valve housing 6.

The first regions of material removal 16 in the angular segments $\alpha 1$, $\alpha 2$, $\alpha 3$ and $\alpha 4$ are continued in the same order of magnitude in the second cylindrical portion 9. Second regions of material removal 17, which are designed in the same order of magnitude as the first regions of material removal 16, are provided in the cylindrical portion 9 in the equal-sized angular segments $\alpha 5$, $\alpha 6$, $\alpha 7$ and $\alpha 8$ situated between the angular segments $\alpha 1$, $\alpha 2$, $\alpha 3$ and $\alpha 4$ (in FIG. 2 only the embodiment with three angular segments $\alpha 5$, $\alpha 6$ and $\alpha 7$ is illustrated, the angular segments $\alpha 6$, $\alpha 7$ not being visible in FIG. 2 owing to the perspective illustration). The cross-sectional profile of the second cylindrical portion 9 thus has a hexagonal profile. Since the areas of these regions of material removal 16 correspond to a standard size for the use of a square, hexagonal or octagonal screwing tool, they can be used as engagement surfaces for a square, hexagonal or octagonal screwing tool for screwing the nonreturn valve 5 into the threaded bore 1.

The primarily cylindrical valve housing 6 in the nonreturn valve 5 has an axially directed cutout 18 which, in a first portion 19 situated at the end of the valve housing 6 facing towards the continuation bore 3, has a smaller inside diameter than in a second portion 20 situated at the end of the valve housing 6 situated in the region of the threaded bore 1. The conical transition 40 between the smaller inside diameter of the first portion 19 and the larger inside diameter of the second portion 20 of the cutout 18 serves as a valve seat 21.

A spherical valve body 22 situated in the second portion 20 is pressed against the valve seat 21. The force required to press the valve body 22 against the valve seat 21 is produced to a certain degree by the spring force of a spring 25 pre-stressed between a first spring plate 23 and a second spring plate 24. The transmission of the spring force of the pre-stressed spring 25 to the valve body 22 takes place via the first spring plate 23. A further part of the force required to press the valve body 22 against the valve seat 21 is created via the pressure difference between the first pressure side and the second pressure side 27.

To allow the pressure difference between the first pressure side 26 and the second pressure side 27 to act on the valve body 22, the valve housing 6 has a first inflow opening 28 at its end face 13 facing towards the first pressure side 26—towards the continuation bore 3. The pressure acting in the first pressure side 26 arrives, via the first inflow opening 28, at the surface portion (broken line in FIG. 3), situated within the first portion 19, of the valve body 22.

The second valve plate 24 is supported on a snap ring 34 which is fitted in an annular groove at the lateral surface of the cutout 18 in the region of a second opening 31 situated at an end face 30, facing towards the second pressure side 37, of the valve housing 6. To enable it to be supported on the snap ring 34, the primarily cylindrical second spring plate 24, which is designed structurally identically to the first spring plate 23 with a view to using as many identical parts as possible in an assembly, has at the edge between the lateral surface and the lower end face a notch 35, which also increases the functional safeguarding of the loaded snap ring against falling out of the groove. To fix the spring 25, the first and second spring plate 23 and 24 has at the edge between the lateral surface and the upper end face an annular notch 36. The spring plate 23 and 24 has a conical transition 29 from the lower end face to the inner bore 32. If the component is used as the first spring plate 23, the conical transition 29 serves as a supporting surface of the first spring plate 23 with respect to the spherical valve body 22.

In the second portion 20 of the cutout 18 of the valve housing 6, a plurality of through-openings 38 are provided in the region of the valve body 22, on a circular line which is concentric with the longitudinal axis 37 of the valve housing 6 and lies on the inner lateral surface of the valve housing 6, these through-openings being distributed in equidistant angular segments $\beta$ and opening into a region 39 situated between the valve housing 6 and the side wall of the threaded bore 1 on the side of the first cylindrical portion 8 facing towards the first pressure side 26.

If the pressure of the hydraulic fluid in the first pressure side 26—in the continuation bore 3—is greater than the counterpressure composed of the pressure of the hydraulic fluid in the second pressure side 27—in the threaded bore 1—and the pressure of the spring force of the prestressed spring 25, the valve body 22 lifts off from its valve seat 21 and enables the hydraulic fluid to flow from the first pressure side 26—in the continuation bore 3—via a flow duct between the valve body 22 and the conical transition 40 of the valve housing 6 and via the through-bores 38 to the region 39 in the threaded bore 1. From the region 39 of the threaded bore 1, the hydraulic fluid flows via three passage ducts 39, formed by regions of material removal 16 of the first cylindrical portion 8 of the valve housing 6, into the threaded bore 1. The valve seat separates the first pressure side 26 from the second pressure side 27.

The invention claimed is:

1. Hydraulic assembly, situated in the housing of which are a continuation bore embodying a first pressure side, a threaded bore embodying a second pressure side, and between the first pressure side and the second pressure side, a nonreturn valve having an external thread which is formed on a first cylindrical portion of a cylindrical valve housing and can be screwed into the threaded bore, a passage duct for a hydraulic fluid flow being formed, between a side wall of the threaded bore and a first region of material removal of the lateral surface of the cylindrical valve housing, in a plurality of angular segments ($\alpha 1$, $\alpha 2$, $\alpha 3$ and $\alpha 4$) of the valve housing, wherein the first regions of material removal are continued in a second cylindrical portion adjoining the first cylindrical portion and serve, with a plurality of second regions of material removal situated between the first regions of material removal exclusively in the second cylindrical portion, as engagements for a tool for screwing the nonreturn valve into the threaded bore.

2. Hydraulic assembly according to claim 1, wherein the cylindrical valve housing comprises two, three or four equal-sized first regions of material removal formed at equidistant angular intervals on the lateral surface of the cylindrical valve housing.

3. Hydraulic assembly according to claim 2, wherein in the second cylindrical portion the two, three or four second regions of material removal, which are equal in size to the first regions of material removal are constructed in the angular segments ($\alpha 5$, $\alpha 6$, $\alpha 7$ and $\alpha 8$) of the valve housing.

4. Hydraulic assembly according to claim 3, wherein the first and second regions of material removal constitute levelled regions and form a square, hexagonal or octagonal profile for a tool for screwing the nonreturn valve into the threaded bore.

5. Hydraulic assembly according to claim 1, wherein the threaded bore merges, at the level of the end, facing towards the first pressure side, of the valve housing screwed fully into the threaded bore, via a transition, into a continuation bore, the diameter of which is designed smaller than the diameter of the threaded bore.

6. Hydraulic assembly according to claim 5, wherein the transition has a conical form.

7. Hydraulic assembly according to claim 5, wherein the hydraulic fluid flow between the valve housing and the transition between the threaded bore and the continuation bore is interrupted by the valve housing pressing against the transition.

8. Hydraulic assembly according to claim 1, wherein the nonreturn valve contains a valve seat which is formed by a conical transition from a first portion of smaller inside diameter to a second portion of larger inside diameter of a cutout of the hollow-cylindrical nonreturn valve.

9. Hydraulic assembly according to claim 8, wherein the first portion of the cutout forms a first inflow opening of the nonreturn valve.

10. Hydraulic assembly according to claim 9, wherein the nonreturn valve has a second opening at the end of the valve housing opposite the first inflow opening.

11. Hydraulic assembly according to claim 10, wherein the second portion of the cutout contains a spherical valve body which is pressed against the valve seat by the spring force of a prestressed spring likewise situated in the second portion of the cutout and the pressure difference between the pressure prevailing at the second opening and the pressure prevailing at the first inflow opening.

12. Hydraulic assembly according to claim 8, wherein he hollow-cylindrical nonreturn valve has in the second portion of the cutout a plurality of through-openings which are distributed in equidistant angular segments ($\beta$) on a circular line which is concentric with the longitudinal axis of the nonreturn valve and lies on the inner lateral surface of the valve housing, these through-openings opening into a region of the second pressure side of the threaded bore, which region is situated on the side of the first cylindrical portion facing towards the first pressure side.

13. Hydraulic assembly according to claim 11, wherein the spring is prestressed between a first and second spring plate.

14. Hydraulic assembly according to claim 13, wherein the first and second spring plate have the same geometry.

15. Hydraulic assembly according to claim 13, wherein the spring force of the prestressed spring is transmitted to the valve body via the first spring plate.

16. Hydraulic assembly according to claim 13, wherein the second spring plate is supported against a snap ring guided in an annular groove at the inner lateral surface of the hollow-cylindrical valve housing.

17. Hydraulic assembly according to claim 13, wherein the first and second spring plate each has an inner bore for supplying the pressure prevailing at the second opening to the valve body.

* * * * *